US007823566B2

(12) United States Patent
Fox et al.

(10) Patent No.: US 7,823,566 B2
(45) Date of Patent: Nov. 2, 2010

(54) VIBRATION REDUCING SYSTEM USING A PUMP

(75) Inventors: Isaac Ethan Fox, Houston, TX (US); Michael Edward Leinen, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 304 days.

(21) Appl. No.: 12/078,413

(22) Filed: Mar. 31, 2008

(65) Prior Publication Data

US 2009/0241911 A1    Oct. 1, 2009

(51) Int. Cl.

| | |
|---|---|
| ***F02B 75/06*** | (2006.01) |
| ***F02D 1/02*** | (2006.01) |
| ***F02M 59/38*** | (2006.01) |
| ***G06F 19/00*** | (2006.01) |

(52) U.S. Cl. ..................... 123/500; 123/192.1; 701/111

(58) Field of Classification Search .......... 123/500–504
See application file for complete search history.

(56) References Cited

U.S. PATENT DOCUMENTS

| | | | | |
|---|---|---|---|---|
| 1,736,242 | A | 11/1929 | Attendu | |
| 2,255,773 | A | 9/1941 | Heftler | |
| 2,428,408 | A | 10/1947 | Beeh | |
| 3,614,944 | A | 10/1971 | Ulbing | |
| 4,100,903 | A | 7/1978 | Roosa | |
| 4,325,342 | A | 4/1982 | Kohler et al. | |
| 4,345,559 | A * | 8/1982 | Kuttner et al. | 123/435 |
| 4,478,196 | A | 10/1984 | Hafner et al. | |
| 4,694,789 | A | 9/1987 | Frost | |
| 4,766,863 | A * | 8/1988 | Fujimori | 123/500 |
| 4,884,549 | A * | 12/1989 | Kelly | 123/500 |
| 4,922,869 | A | 5/1990 | Kadomukai et al. | |
| 4,977,508 | A | 12/1990 | Tanaka et al. | |
| 5,000,151 | A * | 3/1991 | Eisele et al. | 123/503 |
| 5,094,216 | A | 3/1992 | Miyaki et al. | |
| 5,111,784 | A | 5/1992 | Kuriyama et al. | |
| 5,133,645 | A | 7/1992 | Crowley et al. | |
| 5,197,438 | A | 3/1993 | Kumano et al. | |

(Continued)

FOREIGN PATENT DOCUMENTS

EP    1072781 A2    1/2001

(Continued)

OTHER PUBLICATIONS

Tyler M. Nester et al., "Experimental Observations of Centrifugal Pendulum Vibration Absorbers", The 10th International Symposium on Transport Phenomena and Dynamics of Rotating Machinery, Mar. 7-11, 2004).

*Primary Examiner*—Stephen K Cronin
*Assistant Examiner*—Arnold Castro
(74) *Attorney, Agent, or Firm*—Finnegan, Henderson, Farabow, Garrett & Dunner LLC

(57) ABSTRACT

A vibration reducing system for an engine is disclosed. The vibration reducing system includes at least one pumping member movable through a plurality of pumping strokes during an engine cycle. The vibration reducing system also includes a controller in communication with the at least one pumping member, the controller being configured to identify a vibration characteristic of the engine. The controller also is configured to adjust the displacement of fuel during at least one of the plurality of pumping strokes based on the vibration characteristic.

21 Claims, 2 Drawing Sheets

U.S. PATENT DOCUMENTS

| | | | | |
|---|---|---|---|---|
| 5,230,613 | A | 7/1993 | Hilsbos et al. | |
| 5,271,366 | A | 12/1993 | Shimada et al. | |
| 5,332,061 | A | 7/1994 | Majeed et al. | |
| 5,564,391 | A * | 10/1996 | Barnes et al. | 123/500 |
| 5,685,275 | A | 11/1997 | Djordjevic | |
| 5,697,343 | A | 12/1997 | Isozumi et al. | |
| 5,881,698 | A | 3/1999 | Tuckey et al. | |
| 6,142,125 | A | 11/2000 | Shimayama et al. | |
| 6,257,204 | B1 | 7/2001 | Kamijo et al. | |
| 6,318,343 | B1 * | 11/2001 | Nakagawa et al. | 123/500 |
| 6,336,070 | B1 | 1/2002 | Lorenz et al. | |
| 6,672,290 | B2 | 1/2004 | Ricco | |
| 6,705,297 | B2 | 3/2004 | Takeda et al. | |
| 6,913,447 | B2 * | 7/2005 | Fox et al. | 417/269 |
| 6,978,769 | B2 | 12/2005 | Höglund et al. | |
| 7,121,261 | B2 | 10/2006 | Kinose | |
| 7,182,067 | B2 * | 2/2007 | Ricco et al. | 123/446 |
| 7,406,949 | B2 * | 8/2008 | Puckett | 123/506 |
| 7,559,313 | B2 * | 7/2009 | Tokuo et al. | 123/501 |
| 2002/0078928 | A1 | 6/2002 | Onishi et al. | |
| 2006/0000446 | A1 * | 1/2006 | Ricco et al. | 123/446 |
| 2007/0217925 | A1 * | 9/2007 | Tian et al. | 417/279 |
| 2008/0098991 | A1 | 5/2008 | Eddy | |
| 2008/0109152 | A1 * | 5/2008 | Puckett | 123/495 |

FOREIGN PATENT DOCUMENTS

| | | | |
|---|---|---|---|
| EP | 1241349 | A2 | 9/2002 |
| EP | 1327766 | A2 | 7/2003 |
| EP | 1669579 | A2 | 6/2006 |
| EP | 1683954 | A1 | 7/2006 |
| EP | 1741912 | A2 | 1/2007 |

* cited by examiner

VIBRATION REDUCING SYSTEM USING A PUMP

TECHNICAL FIELD

The present disclosure relates generally to a vibration reducing system and, more particularly, to a vibration reducing system utilizing a pump.

BACKGROUND

Common rail fuel systems typically employ multiple injectors connected to a common rail that is provided with high pressure fuel. In order to efficiently accommodate different combinations of injections at a variety of timings and injection amounts, the systems generally include a variable discharge pump in fluid communication with the common rail. One type of variable discharge pump is a cam driven, inlet- or outlet-metered pump.

A cam driven, inlet- or outlet-metered pump generally includes multiple plungers, each plunger being disposed within an individual pumping chamber. The plunger is connected to a lobed cam by way of a follower such that, as a crankshaft of an associated engine rotates, the cam likewise rotates and the connected lobe(s) reciprocatingly drives the plunger to displace (i.e., pump) fuel from the pumping chamber into the common rail. The amount of fuel pumped by the plunger into the common rail depends on the amount of fuel metered into the pumping chamber prior to the displacing movement of the plunger, or the amount of fluid spilled to a low-pressure reservoir during the displacing stroke of the plunger.

The variable discharge pump may be utilized to cancel or dampen vibration and noise. That is, by varying the displacement of fuel, a resulting torque may be transferred in reverse direction to the cam, thereby reducing and/or canceling vibration and noise. However, determining and controlling the timings and displacement of the fuel to cancel or reduce vibration can be difficult.

One attempt at reducing engine vibration is described in U.S. Pat. No. 5,111,748 (the '748 patent), issued to Kuriyama et al. on May 12, 1992. The '748 patent discloses an apparatus that induces vibrations in an alternator to reduce vibrations of a vehicle engine and a vehicle body due to irregular engine combustion. Specifically, the '748 patent changes the torque load of the alternator, which is fixed to the engine, to create an angle moment on the body of the alternator. This angle moment is transferred to the engine and reduces engine vibration. In particular, a voltage higher than the output voltage of the alternator is applied to field windings to change the torque load in response to a change in engine speed. Thus, when the alternator vibrations and the engine vibrations are in an inverse phase relationship, the vibrations from the alternator may cancel the vibrations from the engine.

Although the apparatus disclosed in the '748 patent may help minimize engine vibrations, it may have a limited range. That is, an alternator may be very limited in what vibrational amplitude and period it can create. Thus, the alternator vibration may be too little to affect large amplitude vibrations initiated within the engine.

SUMMARY

In one aspect, the present disclosure is directed to a vibration reducing system for an engine. The vibration reducing system may include at least one pumping member movable through a plurality of pumping strokes during an engine cycle. The vibration reducing system may also include a controller configured to identify a vibration characteristic of the engine. The controller may also be configured to adjust the displacement of fuel during at least one of the plurality of pumping strokes based on the vibration characteristic.

In another aspect, the present disclosure is directed to a method of controlling fuel delivery to an engine. The method may include displacing fuel via at least one pumping member, injecting fuel into the engine, and identifying a vibration characteristic of the engine. The method may further include varying the fuel displacing via the at least one pumping member based on the vibration characteristic.

DETAILED DESCRIPTION

Figure 1:
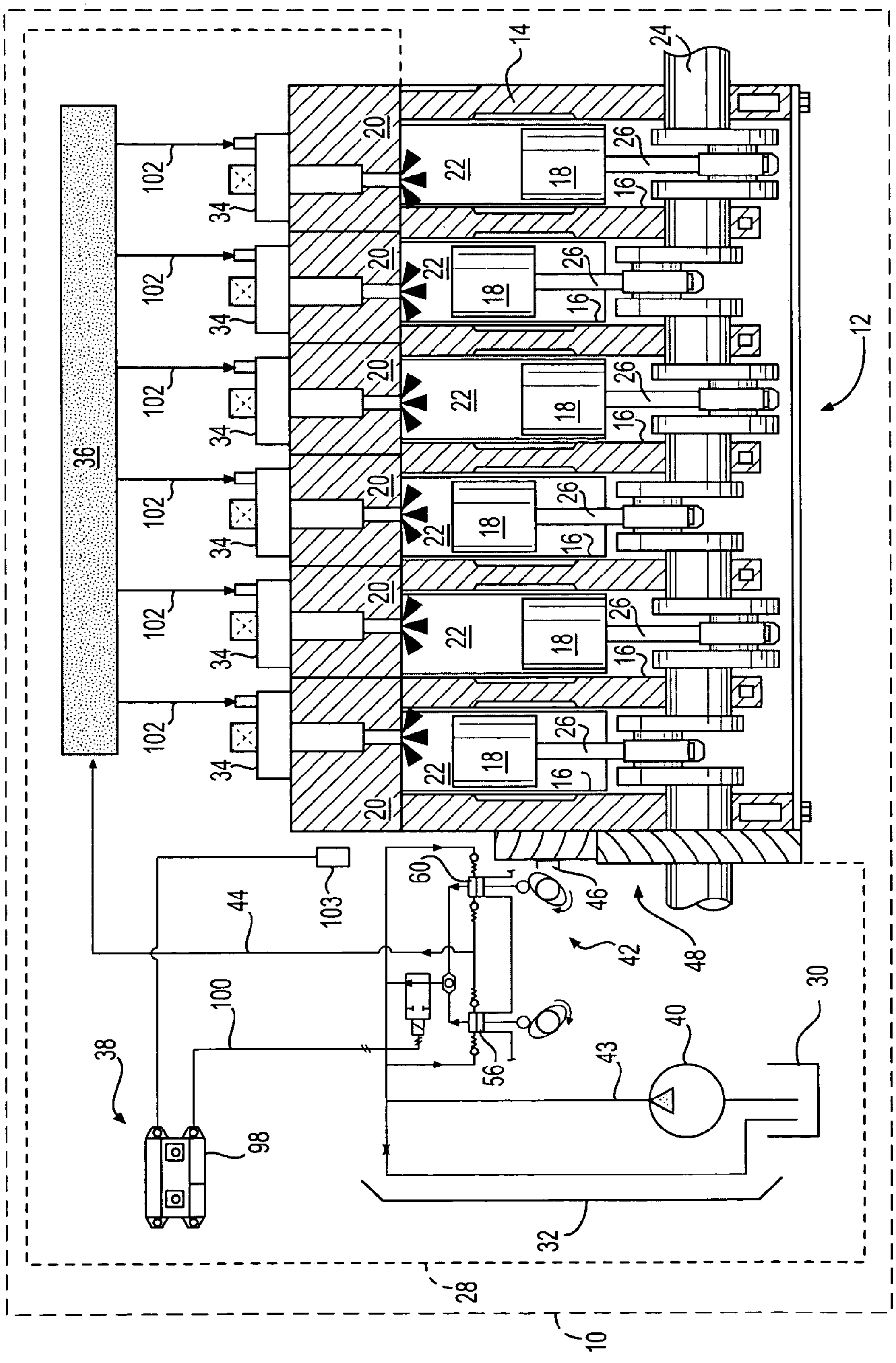
FIG. 1 is a schematic and diagrammatic illustration of an exemplary disclosed fuel system.

FIG. 1 illustrates a power system 10 having an engine 12 and an exemplary embodiment of a fuel system 28. Power system 10, for the purposes of this disclosure, is depicted and described as a four-stroke diesel engine. One skilled in the art will recognize, however, that engine 12 may be any other type of internal combustion engine such as, for example, a gasoline or a gaseous fuel powered engine.

As illustrated in FIG. 1, engine 12 may include an engine block 14 that at least partially defines a plurality of cylinders 16. A piston 18 may be slidably disposed within each cylinder 16, and engine 12 may also include a cylinder head 20 associated with each cylinder 16. Cylinder 16, piston 18, and cylinder head 20 may together form a combustion chamber 22. In the illustrated embodiment, engine 12 includes six combustion chambers 22. One skilled in the art will readily recognize, however, that engine 12 may include a greater or lesser number of combustion chambers 22 and that combustion chambers 22 may be disposed in an "in-line" configuration, a "V" configuration, or in any other conventional configuration.

Engine 12 may include a crankshaft 24 that is rotatably disposed within engine block 14. A connecting rod 26 may connect each piston 18 to crankshaft 24 so that a sliding motion of piston 18 within each respective cylinder 16 results in a rotation of crankshaft 24. Similarly, a rotation of crankshaft 24 may result in a sliding motion of piston 18. Engine 12 may also include a gear train 48 coupled to crankshaft 24.

Fuel system 28 may include components driven by crankshaft 24 to deliver injections of pressurized fuel into each combustion chamber 22. Specifically, fuel system 28 may include a tank 30 configured to hold a supply of fuel, a fuel pumping arrangement 32 configured to pressurize the fuel and direct the pressurized fuel to a plurality of fuel injectors 34 by way of a manifold or common rail 36, and a control system 38.

Fuel pumping arrangement 32 may include one or more pumping devices that function to increase the pressure of the fuel and direct one or more pressurized streams of fuel to manifold 36. In one example, fuel pumping arrangement 32 may include a low-pressure source 40 disposed in series with a high-pressure source 42. Low-pressure source 40 may embody a transfer pump that provides low-pressure feed to high-pressure source 42 via a passageway 43. High-pressure source 42 may receive the low-pressure feed and further increase the pressure of the fuel. High-pressure source 42 may be connected to manifold 36 by way of a fuel line 44. One or more filtering elements (not shown), such as a primary filter and a secondary filter, may be disposed within fuel lines 44 and/or passageway 43 in series relation to remove debris and/or water from the fuel pressurized by fuel pumping arrangement 32, if desired.

One or both of low-pressure source 40 and high-pressure source 42 may be operatively connected to engine 12 and driven by crankshaft 24. Low-pressure source 40 and/or high-pressure source 42 may be connected with crankshaft 24 in any manner readily apparent to one skilled in the art where a rotation of crankshaft 24 will result in a corresponding driving rotation of a pump shaft. For example, a pump driveshaft 46 of high-pressure source 42 is shown in FIG. 1 as being connected to crankshaft 24 through the gear train 48.

Figure 2:
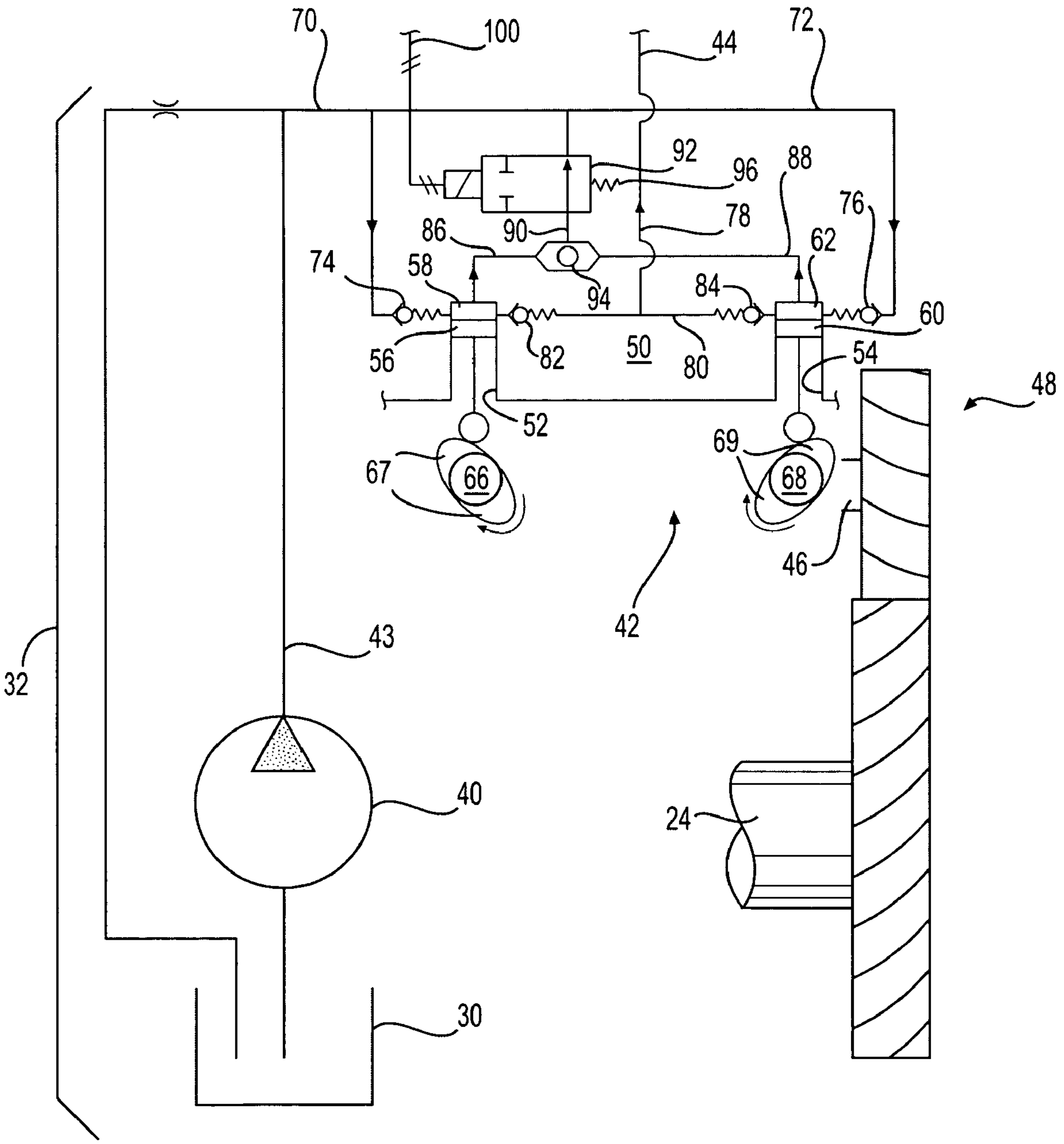
FIG. 2 is a schematic and diagrammatic illustration of an exemplary disclosed pump that may be used with the fuel system of FIG. 1.

As illustrated in FIG. 2, high-pressure source 42 may include a housing 50 defining a first barrel 52 and a second barrel 54. High-pressure source 42 may also include a first plunger 56 slidably disposed within first barrel 52 such that, together, first plunger 56 and first barrel 52 may define a first pumping chamber 58. High-pressure source 42 may also include a second plunger 60 slidably disposed within second barrel 54 such that, together, second plunger 60 and second barrel 54 may define a second pumping chamber 62. It is contemplated that additional pumping chambers may be included within high-pressure source 42, if desired.

A first driver 66 and a second driver 68 may operatively connect the rotation of crankshaft 24 to first and second plungers 56, 60, respectively. First and second drivers 66, 68 may include any mechanism for driving first and second plungers 56, 60 such as, for example, a cam, a swash-plate, a wobble-plate, a solenoid actuator, a piezo actuator, a hydraulic actuator, a motor, or any other driving mechanism known in the art. In the example of FIG. 2, first and second drivers 66, 68 are cams, each cam having two cam lobes 67 and 69, respectively. Thus, a single full rotation of first driver 66 may result in two corresponding reciprocations between two spaced apart end positions of first plunger 56. And, a single full rotation of second driver 68 may result in two similar corresponding reciprocations of second plunger 60.

Gear train 48 may be configured such that, during a single full engine cycle (i.e., the movement of piston 18 through an intake stroke, a compression stroke, a power stroke, and an exhaust stroke or two full rotations of crankshaft 24), pump driveshaft 46 may rotate both first and second drivers 66, 68 two times. Thus, each of first and second plungers 56, 60 may reciprocate within their respective barrels four times for a given engine cycle to produce a total of eight consecutive pumping strokes numbered 1-8. The odd numbered strokes may correspond with the motion of first plunger 56 and the even numbered strokes may correspond with the motion of second plunger 60.

First and second drivers 66, 68 may be positioned relative to each other such that first and second plungers 56, 60 are caused to reciprocate out of phase with one another, thereby distributing the eight pumping strokes substantially equally relative to the rotational angle of crankshaft 24. It is contemplated that first and second drivers 66, 68, if embodied as lobed cams, may alternatively include any number of lobes to produce a corresponding number of pumping strokes. It is also contemplated that a single driver may be connected to move both first and second plungers 56, 60 between their respective end positions, if desired.

High-pressure source 42 may include an inlet 70 fluidly connecting high-pressure source 42 to passageway 43. High-pressure source 42 may also include a low-pressure gallery 72 in fluid communication with inlet 70 and in selective communication with first and second pumping chambers 58, 62. A first inlet check valve 74 may be disposed between low-pressure gallery 72 and first pumping chamber 58 to allow a unidirectional flow of low-pressure fuel into first pumping chamber 58. A second inlet check valve 76 may be disposed between low-pressure gallery 72 and second pumping chamber 62 to allow a unidirectional flow of low-pressure fuel into second pumping chamber 62.

High-pressure source 42 may also include an outlet 78, fluidly connecting high-pressure source 42 to fuel line 44. High-pressure source 42 may include a high-pressure gallery 80 in selective fluid communication with first and second pumping chambers 58, 62 and outlet 78. A first outlet check valve 82 may be disposed between first pumping chamber 58 and high-pressure gallery 80 to allow fluid displaced from first pumping chamber 58 into high-pressure gallery 80. A second outlet check valve 84 may be disposed between second pumping chamber 62 and high-pressure gallery 80 to allow fluid displaced from second pumping chamber 62 to be passed into high-pressure gallery 80.

High-pressure source 42 may also include a first spill passageway 86 selectively fluidly connecting first pumping chamber 58 with a common spill passageway 90. High-pressure source 42 may also include a second spill passageway 88 fluidly communicating second pumping chamber 62 with common spill passageway 90. A spill control valve 92 may be disposed within common spill passageway 90 between first and second spill passageways 86, 88 and low-pressure gallery 72 to selectively allow some of the fluid displaced from first and second pumping chambers 58, 62 to flow through first and second spill passageways 86, 88 and into low-pressure gallery 72. The amount of fluid displaced (i.e., spilled) from first and second pumping chambers 58, 62 into low-pressure gallery 72 may be inversely proportional to the amount of fluid displaced (i.e., pumped) into high-pressure gallery 80.

The fluid connection between pumping chambers 58, 62 and low-pressure gallery 72 may be established by way of a selector valve 94 such that only one of first and second pumping chambers 58, 62 may fluidly connect to low-pressure gallery 72 at a given time. Because first and second plungers 56, 60 may move out of phase relative to one another, one pumping chamber may be at a high-pressure (pumping stroke) when the other pumping chamber is at a low-pressure (intake stroke), and vice versa. This action may be exploited to move an element of selector valve 94 back and forth to fluidly connect either first spill passageway 86 to spill control valve 92, or second spill passageway 88 to spill control valve 92. Thus, first and second pumping chambers 58, 62 may share a common spill control valve 92. It is contemplated, however, that a separate spill control valve may alternatively be dedicated to controlling the effective displacement of fluid from each individual pumping chamber, if desired. It is further contemplated that, rather than metering an amount of fuel spilled from first and second pumping chambers 58, 62 (also know as outlet metering), the amount of fuel drawn into and subsequently displaced from first and second pumping chambers may alternatively be metered (also known as inlet metering).

Spill control valve 92 may be normally biased toward a first position, at which fluid is allowed to flow into low-pressure gallery 72 via a biasing spring 96. Spill control valve 92 may also be moved by way of a solenoid or pilot force to a second position at which fluid is blocked from flowing into low-pressure gallery 72. The movement and timing of spill control valve 92 between the flow passing and flow blocking positions relative to the displacement position of first and/or second plungers 56, 60, may determine what fraction of the fluid displaced from the respective pumping chambers spills to low-pressure gallery 72 or is pumped to high-pressure gallery 80.

Referring back to FIG. 1, fuel injectors 34 may be disposed within cylinder head 20 and connected to manifold 36 by way of distribution lines 102 to inject the fuel displaced from first and second pumping chambers 58, 62. Fuel injectors 34 may embody, for example, electronically actuated and controlled injectors, mechanically actuated and electronically controlled injectors, digitally controlled fuel valves, or any other type of fuel injectors known in the art. Each fuel injector 34 may be operable to inject an amount of pressurized fuel into an associated combustion chamber 22 at predetermined timings, fuel pressures, and fuel flow rates.

The timing of fuel injection into combustion chamber 22 may be synchronized with the motion of piston 18 and, therefore, the rotation of crankshaft 24. For example, fuel may be injected as piston 18 nears a top-dead-center position during a compression stroke to allow for compression-ignited-combustion of the injected fuel. Alternatively, fuel may be injected as piston 18 begins the compression stroke heading towards a top-dead-center position for homogenous charge compression ignition operation. Fuel may also be injected as piston 18 is moving from a top-dead-center position towards a bottom-dead-center position during an expansion stroke for a late post injection to create a reducing atmosphere for after-treatment regeneration. The combustion resulting from the injection of fuel may generate a force on piston 18 that travels through connecting rod 26 and crankshaft 24 to rotate gear train 48 for pressurizing of additional fuel.

Referring now to FIGS. 1 and 2, control system 38 may control what amount of fluid displaced from first and second pumping chambers 58, 62 is spilled into low-pressure gallery 72 and what remaining amount of fuel is pumped through high-pressure gallery 80 to manifold 36 for subsequent injection and combustion. Specifically, control system 38 may include an electronic control module (ECM) 98 in communication with spill control valve 92. Control signals generated by ECM 98 directed to spill control valve 92 via a communication line 100 may determine an opening and a closing timing for spill control valve 92 that results in a desired fuel flow rate to manifold 36 and/or a desired fuel pressure within manifold 36.

ECM 98 may embody a single microprocessor or multiple microprocessors that include a way to control the operation of fuel system 28. Numerous commercially available microprocessors can be configured to perform the functions of ECM 98. It should be appreciated that ECM 98 could readily embody a general engine or power system microprocessor capable of controlling and monitoring numerous and diverse functions, if desired. For example, ECM 98 may monitor a load, a speed, and/or a compression ratio of engine 12, and injection timings of the injectors 34. ECM 98 may include a memory, a secondary storage device, a processor, software, and any other components for running an application. Various other circuits may be associated with ECM 98 such as power supply circuitry, signal conditioning circuitry, solenoid driver circuitry, and other types of circuitry.

ECM 98 may selectively open and close spill control valve 92 to spill or pump fuel in response to a demand. That is, depending on a rotational speed of engine 12 and the load on engine 12, a predetermined amount of fuel should be injected and combusted in order to maintain the engine speed and a desired torque output. In order for injectors 34 to inject this predetermined amount of fuel, a certain quantity and pressure of the fuel must be present within manifold 36 at the time of injection. ECM 98 may include one or more fuel maps stored in a memory thereof relating various engine conditions to the required quantity of fuel and various engine characteristics to desired pump stroke timings. Each of these maps may be in the form of tables, graphs, and/or equations and include a compilation of data collected from lab and/or field operation of engine 12.

For example, if a total fuel demand for a single complete engine cycle is 7,200 $mm^3$ and the displacement capacity of a single stroke is 900 $mm^3$, each stroke would be required to produce at 100% of the stroke's capacity (i.e., full displacement) to satisfy the total fuel demand. In this situation, each of the eight pumping strokes may contribute substantially equally to the total amount of fuel pumped. Under no circumstance can any of the pumping strokes produce more than 100% of the stroke's displacement capacity. However, some strokes may, at times, displace greater than 100% of an equal pumping portion. That is, each of the eight pumping strokes may contribute an un-equal amount.

Additionally, ECM 98 may contain an oscillation map that correlates the load and a speed of engine 12 with an oscillatory signal of gear train 48. That is, as the load and/or speed of engine 12 changes because of, for example, an operation initiation and/or cancelation of an air compressor (not shown), individual elements of gear train 48 may speed up or slow down. The changing speeds may generate an oscillating signal, which can be broken down to specific vibration frequencies and amplitudes.

The oscillation map may contain, from field analysis and/or lab testing, specific timings and fuel displacement amounts of individual pumping strokes that relate to these vibration frequencies and amplitudes. That is, as high-pressure source 42 is operated to pressurize fuel, the reciprocating motion of plungers 56, 60 may generate a reverse torque directed back through drivers 66, 68 to gear train 48. This reverse torque may have frequency and amplitude characteristics that change depending on the displacement amounts and timings (i.e. the split factor) of fuel within each of the eight pumping strokes. The timings and displacement amounts of fuel within the plungers 56, 60 may constitute an input torque profile.

The oscillation map may correlate certain vibration frequencies and amplitudes of engine 12 to different torque profiles that may be generated by fuel pumping arrangement 32. ECM 98 may reference the oscillation map and selectively control plungers 56, 60 based on the correlations to dampen or possibly even cancel the oscillating signal described above. That is, ECM 98 may sense a change in load on or speed of engine 12 such as, for example, when operation of the compressor is initiated, and an associated vibration characteristic change in gear train 48. ECM 98 may then reference the oscillation map and determine an input torque profile necessary to dampen the vibration while providing for current fuel demands, and selectively control plungers 56, 60 based on the input torque profile.

Alternatively or additionally, one or more sensors 103 may be in communication with ECM 98 to directly monitor changes in the vibration and/or noise of gear train 48. ECM 98 may receive input from sensors 103 and reference the oscillation and fuel maps to determine the input torque profile of plungers 56, 60 needed to dampen vibration and/or noise while providing the needed fuel to injectors 34. It is further contemplated that sensors 103 may directly monitor vibration characteristics of other components associated with engine 12 that may experience vibration, for example, engine mounts, if desired.

INDUSTRIAL APPLICABILITY

The disclosed system finds potential application in any engine where it is desirable to cancel and/or reduce vibration and noise. The disclosed system may help dampen and/or cancel vibration and noise within the engine by selectively controlling the timings and displacement amounts of fuel of an associated pump. One skilled in the art will recognize that the disclosed pump could be utilized in relation to any fluid system. For example, the disclosed pump could be utilized in relation to a fuel or to a non-fuel hydraulic medium such as engine lubricating oil. The operation of power system 10 will now be explained.

Referring to FIG. 1, when power system 10 is in operation, first and second drivers 66, 68 may be rotated by pump driveshaft 46 causing first and second plungers 56, 60 to reciprocate within respective first and second barrels 52, 54, out of phase with one another. When first plunger 56 moves through the intake stroke, second plunger 60 may move through the pumping stroke. During the intake stroke of first plunger 56, fluid may be drawn into first pumping chamber 58 via first inlet check valve 74. As first plunger 56 begins the pumping stroke, the increasing fluid pressure within first pumping chamber 58 may cause selector valve 94 to move and allow displaced fluid to flow (i.e., spill) from first pumping chamber 58 through spill control valve 92 to low-pressure gallery 72. When it is desired to output high-pressure (i.e., pump) fluid from high-pressure source 42, spill control valve 92 may move to block fluid flow from first pumping chamber 58 to low-pressure gallery 72.

Closing spill control valve 92 may cause an immediate build up of pressure within first pumping chamber 58. As the pressure continues to increase within first pumping chamber 58, a pressure differential across first outlet check valve 82 may produce an opening force that exceeds a spring closing force of first outlet check valve 82. When the spring closing force of first outlet check valve 82 has been surpassed, first outlet check valve 82 may open and high-pressure fluid from within first pumping chamber 58 may flow through first outlet check valve 82 into high-pressure gallery 80 and then into manifold 36 by way of fuel line 44.

One skilled in the art will appreciate that the timing at which spill control valve 92 closes and/or opens may determine what fraction of the amount of fluid displaced by the first plunger 56 is pumped into the high-pressure gallery 80 and what fraction is pumped back to low-pressure gallery 72. This operation may serve as a mechanism by which pressure can be maintained and controlled in manifold 36. As noted in the previous section, control of spill control valve 92 may be provided by signals received from ECM 98 over communication line 100.

Toward the end of the pumping stroke, as the angle of cam lobe 67 causing first plunger 56 to move decreases, the reciprocating speed of first plunger 56 may proportionally decrease. As the reciprocating speed of first plunger 56 decreases, the opening force caused by the pressure differential across first outlet check valve 82 may near and then fall below the spring force of first outlet check valve 82. First outlet check valve 82 may move to block fluid therethrough when the opening force caused by the pressure differential falls below the spring force of first outlet check valve 82.

As second plunger 60 switches modes from filling to pumping (and first plunger 56 switches from pumping to filling), selector valve 94 may move to block fluid flow from first pumping chamber 58 and open the path between second pumping chamber 62 and spill control valve 92. Thus, allowing spill control valve 92 to control the discharge of second pumping chamber 62. Second plunger 60 may then complete a pumping stroke similar to that described above with respect to first plunger 56.

During any one of the pumping strokes of first and second plungers 56, 60, the contribution amount of each pumping stroke to the total fuel delivered by high pressure source 42 may be individually varied to dampen the vibration and/or noise transmitted through drivers 66, 68 and gear train 48 to crankshaft 24. The contribution amount and, thus, the effective displacement of each stroke may be reduced by keeping spill control valve 92 in the open position for a greater period of time during the pumping stroke. The effective displacement of each stroke may be increased by keeping spill control valve 92 in the closed position for a greater period of time. ECM 98 may vary the contribution amount and effective displacement in response to anticipated, known, and/or measured vibrations, noise, etc. and/or a demand for fuel being less than a maximum output capacity of high-pressure source 42.

In particular, as fuel is displaced by plungers 56, 60, the pressurizing force may be directed in reverse direction through pump driveshaft 46 and gear train 48 to crankshaft 24. The frequency and amplitude of this force may result in the torque profile described above. The torque profile may dampen and/or cancel undesired vibration and/or noise from engine 12.

The timing of the pumping strokes of plungers 56, 60 may be regulated by ECM 98 according to known engine operation conditions. Specifically, ECM 98 may adjust the timings and/or displacement of fuel within individual pumping strokes in response to known characteristics of gear train 48 and changes in the load and/or speed of engine 12. For example, the load on engine 12 may change as an associated air compressor, hydraulic pump, air conditioner, or other parasitic device is operated. As the load and/or speed of engine 12 changes, the vibration characteristics of gear train 48 may also change. These changing vibration characteristics, if unaccounted for, could become excessive and result in undesired noise within gear train 48, crankshaft 24, and/or engine 12. In response thereto, ECM 98 may selectively vary the timings and/or displacement amounts of the fuel within the pumping strokes to introduce a specific torque profile on pump driveshaft 46 that actively dampens and possibly even cancels the vibration and noise of engine 12.

For example, if a total fuel demand for a single complete engine cycle is less than 7,200 $mm^3$, some or all eight pumping strokes may be reduced from their max capacity of 900 $mm^3$. That is, if the total fuel demand is 5,400 $mm^3$, six strokes could be controlled to contribute their maximum capacity and the remaining two could be completely eliminated. Alternatively, all eight strokes could be controlled to displace 75% of their max capacity. Each stroke could also be controlled to displace varying amounts, the sum of the displaced volume equaling the total fuel demand. Each combination of pumping strokes may correspond to a particular torque profile, which may dampen and/or eliminate certain vibration characteristics and noise of engine 12.

ECM 98 may determine the displacement of fuel by the proper combination and timing of each of the pumping strokes to dampen the vibration and noise by referencing the oscillation map. For example, ECM 98 may determine an increased load on engine 12 due to the operation of an air compressor. ECM 98 may develop an oscillating signal based on this sensed load and a current speed of engine 12, for example, between 1000 rpm and 1700 rpm. Using these conditions as parameters, ECM 98 may reference the oscillation map to determine the torque profile that would best dampen the generated vibration and noise. The torque profile may consist of, for example, operating the pumping strokes 1, 2, 4, 6, and 7 while eliminating pumping strokes 3, 5, and 8. In this example, a gear train 48 fatigue margin may be improved by more than 20%, load reversals may also be significantly reduced, and engine 12 noises quieted.

The vibration reducing system of the present disclosure may be beneficial in dampening and possibly eliminating vibration and/or noise by selectively varying the timings and effective displacement amount of individual pumping strokes of fuel pumping arrangement 32. By dampening and/or eliminating vibration characteristics and noise, wear on associated components may be reduced and stringent noise pollution guidelines may be met.

It will be apparent to those skilled in the art that various modifications and variations can be made to the pump of the present disclosure. Other embodiments of the pump will be apparent to those skilled in the art from consideration of the specification and practice of the pump disclosed herein. It is intended that the specification and examples be considered as exemplary only, with a true scope being indicated by the following claims and their equivalents.

What is claimed is:

1. A vibration reducing system for an engine, comprising:
- at least one pumping member movable through a plurality of pumping strokes during an engine cycle; and
- a controller configured to identify a change in a vibration characteristic of the engine as a result of a change in load on the engine and adjust a displacement of fuel displaced by the at least one pumping member during at least one of the plurality of pumping strokes based on the identified change in the vibration characteristic.

2. The vibration reducing system of claim 1, wherein the vibration characteristic is associated with a speed of the engine.

3. The vibration reducing system of claim 2, wherein the controller includes at least one map relating the vibration characteristic with an adjustment of the displacement of fuel.

4. The vibration reducing system of claim 3, wherein the controller is configured to adjust the displacement of fuel by varying an effective displacement of at least one of the plurality of pumping strokes.

5. The vibration reducing system of claim 1, further including at least one sensor in communication with the controller and configured to generate a signal indicative of the vibration characteristic, the controller being configured to adjust the displacement of fuel based on the signal.

6. The vibration reducing system of claim 1, wherein the controller includes a map relating a pumping contribution of each of the pumping strokes to a fuel amount demanded during the engine cycle.

7. The vibration reducing system of claim 6, wherein the controller is configured to control the displacement of fuel during each of the plurality of pumping strokes according to the map.

8. The vibration reducing system of claim 3, wherein the identified change in the vibration characteristic is associated with at least one of an operation initiation and an operation cancelation of an engine driven component.

9. The vibration reducing system of claim 8, wherein the engine driven component is at least one of an air compressor, an air conditioner, and a hydraulic element.

10. The vibration reducing system of claim 8, wherein the at least one map relates the vibration characteristic of the engine driven component with the adjustment of the displacement of fuel.

11. The vibration reducing system of claim 1, wherein the at least one pumping member is two pumping members operable out of phase relative to each other, and the controller adjusts an amount of fuel displaced form each of the two pumping members to reduce the vibration characteristic.

12. A method of controlling fuel delivery to an engine, comprising:
- displacing fuel via at least one pumping member;
- injecting the fuel into the engine;
- identifying a vibration characteristic of the engine, including employing a sensor to monitor vibration of a component driven by a crankshaft of the engine; and
- varying the fuel displacing via the at least one pumping member based on the sensed vibration characteristic.

13. The method of claim 12, further including relating an amplitude and a frequency of the sensed vibration characteristic to an amount and a timing of the fuel displacing.

14. The method of claim 12, wherein identifying the vibration characteristic of the engine includes identifying a change in the sensed vibration characteristic as a result of a change of at least one of a load and a speed of the engine.

15. The method of claim 12, wherein the varying step includes varying a torque transmitted to the engine as a result of the fuel displacing.

16. The method of claim 12, further including relating a pumping contribution of individual pumping events to a total amount of fuel demanded during an engine cycle.

17. An engine, comprising:
- an engine block at least partially defining a combustion chamber;
- a crankshaft configured to reciprocatingly drive a piston within the combustion chamber;
- a gear train coupled to the crankshaft;
- a fuel pumping arrangement driven by the gear train to pressurize fuel, the fuel pumping arrangement having at least one pumping member movable through a plurality of pumping strokes during an engine cycle; and
- a controller in communication with the fuel pumping arrangement, the controller being configured to:
  - identify a change in a vibration characteristic of the engine as a result of a change in a load on the engine; and
  - adjust a displacement of fuel displaced by the at least one pumping member during at least one of the plurality of pumping strokes based on the identified change in the vibration characteristic.

18. The engine of claim 17, wherein the controller includes at least one map relating an amplitude and a frequency of the vibration characteristic with an adjustment of the displacement of fuel, the controller configured to vary an effective timing and the displacement of fuel according to the at least one map.

19. The engine of claim 17, wherein the controller includes a map relating a speed and a fuel demand of the engine to a pumping contribution of each of the at least one pumping member relative to a total amount of fuel demanded during the engine cycle, and the controller adjusts the displacement of fuel during each of the plurality of pumping strokes according to the map.

20. The engine of claim 17, wherein the sensed change in the vibration characteristic is associated with at least one of an operation initiation and a cancelation of an engine driven component and the controller is configured to adjust the displacement of fuel to at least reduce the vibration characteristic of the engine driven component.

21. The vibration reducing system of claim 1, wherein the change in the vibration characteristic is associated with a change in the operating state of a component driven from a crankshaft of the engine.

* * * * *